(12) United States Patent
Gurvich (10) Patent No.: US 12,090,586 B2
(45) Date of Patent: Sep. 17, 2024

(54) COMPOSITE/METAL JOINTS FOR COMPOSITE RODS

(71) Applicant: Goodrich Corporation, Charlotte, NC (US)

(72) Inventor: Mark R. Gurvich, Middletown, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 110 days.

(21) Appl. No.: 17/654,389

(22) Filed: Mar. 10, 2022

(65) Prior Publication Data

US 2023/0287914 A1    Sep. 14, 2023

(51) Int. Cl.
*B23P 11/00* (2006.01)
*B29C 65/00* (2006.01)
*B29C 70/76* (2006.01)

(52) U.S. Cl.
CPC ............ *B23P 11/00* (2013.01); *B29C 66/126* (2013.01); *B29C 66/3032* (2013.01);
(Continued)

(58) Field of Classification Search
CPC ........ B29C 65/64; B29C 66/022–0224; B29C 66/126; B29C 66/22–225;
(Continued)

(56) References Cited

U.S. PATENT DOCUMENTS

| 4,392,294 A | * | 7/1983 | Campbell | ............. | F16L 13/141 |
| | | | | | 29/525.04 |
| 4,766,752 A | * | 8/1988 | Gronert | ................. | B21D 22/14 |
| | | | | | 72/110 |

(Continued)

FOREIGN PATENT DOCUMENTS

| DE | 102014014296 A1 | * | 3/2016 | ....... B29C 45/14221 |
| DE | 102014225993 A1 | * | 6/2016 | |
| EP | 3382221 A1 | | 10/2018 | |
| WO | 2005036042 A1 | | 4/2005 | |

OTHER PUBLICATIONS

Translation of DE102014225993 (Year: 2016).*
(Continued)

*Primary Examiner* — Matthew P Travers
(74) *Attorney, Agent, or Firm* — Kinney & Lange, P. A.

(57) ABSTRACT

A method of forming a joint between a composite component and a metallic component is disclosed. The method includes forming a first groove in an outer surface of the metallic component on a first end of the metallic component. The first groove extends circumferentially on the outer surface relative to a center axis of the metallic component, and the first groove extends radially inward from the outer surface relative the center axis. The method further includes inserting the first end of the metallic component into a first end of the composite component. A second groove on the composite component over the first groove of the metallic component such that the composite component extends radially inward into the first groove of the metallic component. A composite hoop reinforcement is then applied in the second groove in a circumferential direction and the composite component, and the composite hoop reinforcement are solidified.

13 Claims, 10 Drawing Sheets

(52) U.S. Cl.
CPC ........ *B29C 66/5221* (2013.01); *B29C 66/721* (2013.01); *B29C 66/742* (2013.01); *B29C 70/766* (2013.01); *B29C 66/534* (2013.01); *B29C 66/73751* (2013.01); *B29C 66/73753* (2013.01); *B29C 66/7392* (2013.01); *B29C 66/7394* (2013.01)

(58) Field of Classification Search
CPC ........... B29C 66/303–30321; B29C 66/30325; B29C 66/5221; B29C 66/534; B29C 66/612; B29C 66/721; B29C 66/73751; B29C 66/73753; B29C 66/739; B29C 66/7392; B29C 66/7394; B29C 66/742–74285; B29C 70/68; B29C 70/682; B29C 70/766; F16L 13/007; F16L 13/141; F16L 25/0072; F16L 47/24; F16B 7/00; B23P 11/00
See application file for complete search history.

(56) References Cited

U.S. PATENT DOCUMENTS

| | | |
|---|---|---|
| 5,227,208 A | 7/1993 | Thongs, Jr. |
| 6,676,169 B1 | 1/2004 | Reynolds, Jr. et al. |
| 9,056,431 B2 | 6/2015 | Bond et al. |
| 9,352,538 B1 | 5/2016 | Olason et al. |
| 2018/0283425 A1* | 10/2018 | Bernard ................ F16B 7/18 |
| 2020/0282664 A1* | 9/2020 | Funck .................. F16D 1/072 |
| 2021/0071707 A1* | 3/2021 | Funck .................. B29C 70/683 |

OTHER PUBLICATIONS

Translation of DE102014014296 (Year: 2016).*
Extended European Search Report dated May 31, 2023, received for corresponding European Application No. 23160778.9, pp. 7.

* cited by examiner

COMPOSITE/METAL JOINTS FOR COMPOSITE RODS

BACKGROUND

The present disclosure relates to joints between two pieces of material, and in particular, to a low-cost joint between a composite piece of material and a metallic piece of material.

Fiber-reinforced polymer-matrix composite materials have exceptional strength and stiffness characteristics while simultaneously being lightweight due to mechanical efficiency of the reinforced fibers. As such, composite materials are desirable for load transfer in weight constrained environments. Composites can be especially efficient materials for different aerospace parts under conditions of uniaxial or/and bending loads as, for example, for linkages, actuators or other similar load-transferring primarily structural elements. In the case of such composite parts, efficiency of reinforced fibers can be remarkable, particularly if fibers are placed in orientations close to the axial direction.

A major challenge to the wider use of composite materials is a reliable yet cost-efficient load transfer mechanism between a composite material and a metallic end. Transferring loads from a composite component is critical for the practical application of composite materials, as this enables the composite parts to be integrated into a wider system. These composite to metallic joints can be expensive to manufacture due to labor consuming machined metallic parts and/or complex shapes in the composite parts, particularly in the joint areas. Thus, low-cost composite/metal joints for composite parts are needed.

SUMMARY

In one embodiment, a method of forming a joint between a composite component and a metallic component includes forming a first groove in an outer surface of the metallic component on a first end of the metallic component. The first groove extends circumferentially on the outer surface relative to a center axis of the metallic component, and the first groove extends radially inward from the outer surface relative the center axis. The method further includes inserting the first end of the metallic component into a first end of the composite component. A second groove is formed on the composite component over the first groove of the metallic component such that the composite component extends radially inward into the first groove of the metallic component. A composite hoop reinforcement is applied in the second groove in a circumferential direction and the composite component and the composite hoop reinforcement are solidified.

In another embodiment, a method of forming a joint between two rods is disclosed. The method includes forming a groove in an outer surface of a first rod proximate a first end of a first rod. The groove extends circumferentially on the outer surface relative to a center axis of the first rod, and the groove extends radially inward from the outer surface relative the center axis. The method further includes forming a cavity in a first end of a second rod. The first end of the first rod is inserted into the cavity of the second rod and the groove of the first rod is within the cavity. A diameter of the second rod is reduced proximate the first end of the second rod to form a reduced diameter portion in the first end of the second rod. The reduced diameter portion is formed over the groove of the first rod and the reduced diameter portion extends radially inward into the groove of the first rod. The method further includes applying a composite wrap circumferentially around the reduced diameter portion of the second rod. The composite wrap includes a plurality of fibers with a circumferential fiber orientation. The method also includes solidifying the composite wrap.

In another embodiment, an assembly includes a metallic component with a first end opposite a second end. An outer surface of the metallic component extends circumferentially about a center axis and extends axially from the first end toward the second end. A groove is in the outer surface of the metallic component proximate the first end and extends radially inward relative the outer surface of the metallic component. The assembly further includes a composite component with a first end opposite a second end. A cavity is in the first end of the composite component and the first end and the groove of the metallic component are inside the cavity. A reduced circumference portion is in the composite component over the groove of the metallic component and extends into the groove. The assembly further includes a composite hoop reinforcement radially outward from the reduced circumference portion and axially over the reduced circumference portion. The composite hoop extends circumferentially around the reduced circumference portion.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings.

DETAILED DESCRIPTION

The disclosure relates to a composite material to metallic material joint. The joint connects and transfers load between a composite component, which may be a composite rod or pipe, to a metallic component, which may be any structure which is primarily metallic. The metallic component may connect to a system outside of the composite to metallic joint. The composite to metallic joint will be described below with reference to FIGS. 1-10.

Figure 1:
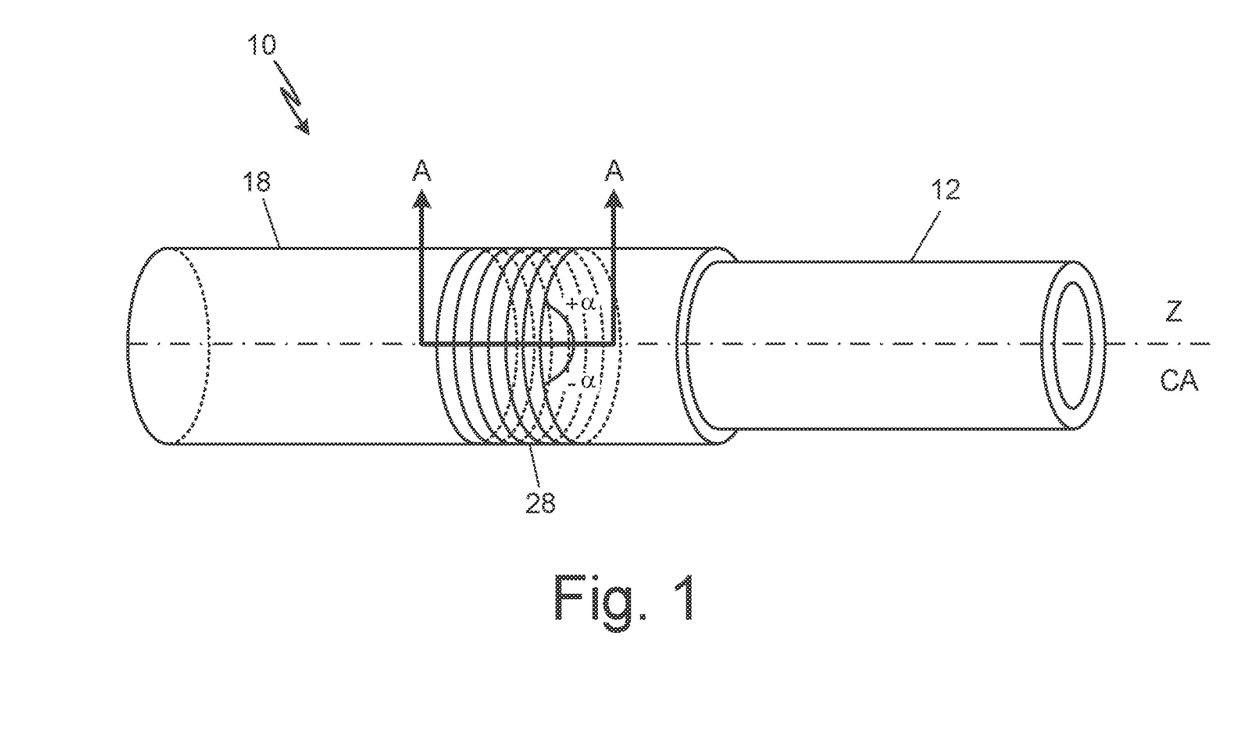
FIG. 1 is a perspective view of a composite to metallic joint.

FIG. 1 is a perspective view of a composite to metallic joint 10. Composite to metallic joint 10 includes metallic component 12, composite component 18, and composite reinforcement 28.

As shown in FIG. 1, metallic component 12 contacts composite component 18. Metallic component 12 can connect to a larger assembly outside of joint 10. Metallic component 12 can be connected to the larger assembly by screwing, welding, bolting or other suitable attachment mechanism. In FIG. 1, metallic component 12 is a hollow cylinder and/or tube. In other examples, metallic component 12 can be a solid rod, a cylinder, a truncated cylinder, a frustoconical, an axisymmetric cylinder or any suitable shape which contacts composite component 18 and enables a connection to the larger assembly. Metallic component 12 can be formed of any suitable metal or alloy known to those of skill in the art. In an embodiment, metallic component 12 can be formed of aluminum to take advantage of its resistance to corrosion and high strength to weight ratio. In other embodiments, metallic component 12 can be formed of titanium or steel. Central axis CA of metallic component 12 is aligned with a z axis of joint 10.

Composite component 18 contacts both metallic component 12 and composite reinforcement 28. In the example of FIG. 1, composite component 18 is a composite tube. In other examples, composite component 18 can be a solid rod, a cylinder, an axisymmetric cylinder, a frustoconical, or any shape suitable for withstanding tensile loads. A central axis of composite component 18 is aligned with the z axis of joint 10 and center axis CA of metallic component 12. A circumference of composite component 18 is larger than a circumference of metallic component 12 so as to enable metallic component 12 to be inserted into at least a portion of composite component 18. Composite reinforcement 28 is substantially hoop shaped and placed in a groove formed in an outer surface of composite component 18.

Figure 2:
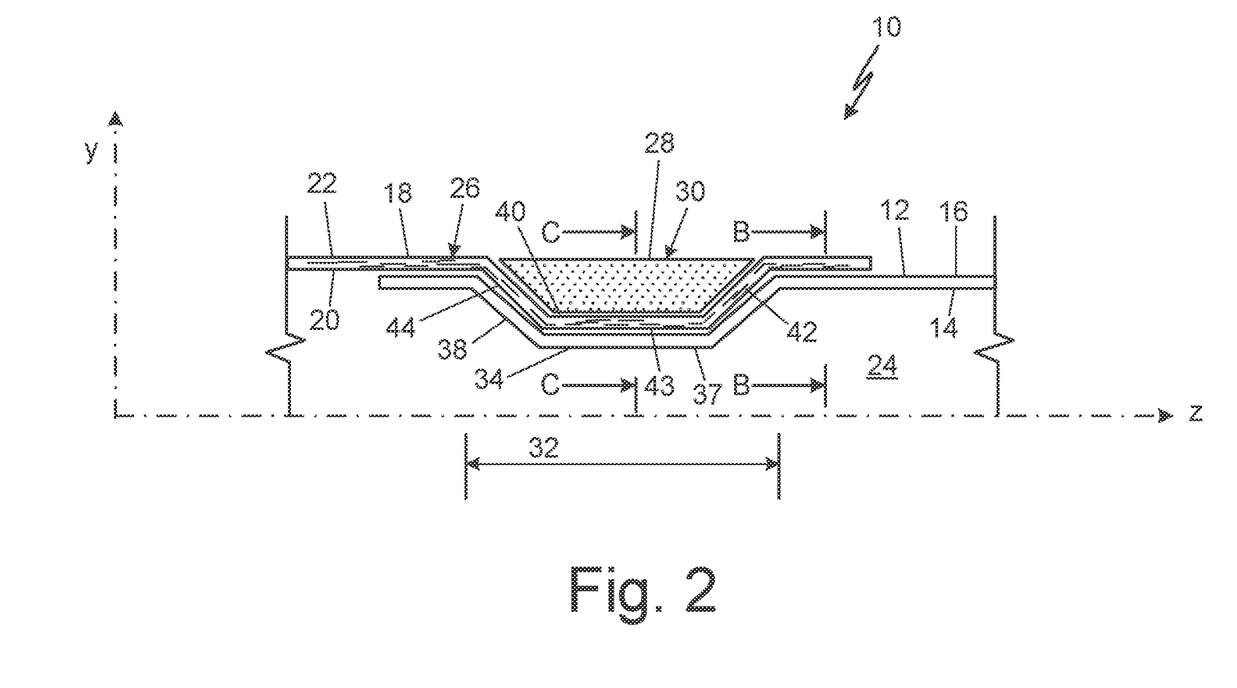
FIG. 2 is an axial cross-sectional view of the composite to metallic joint taken along line A-A of FIG. 1.
Figure 3:
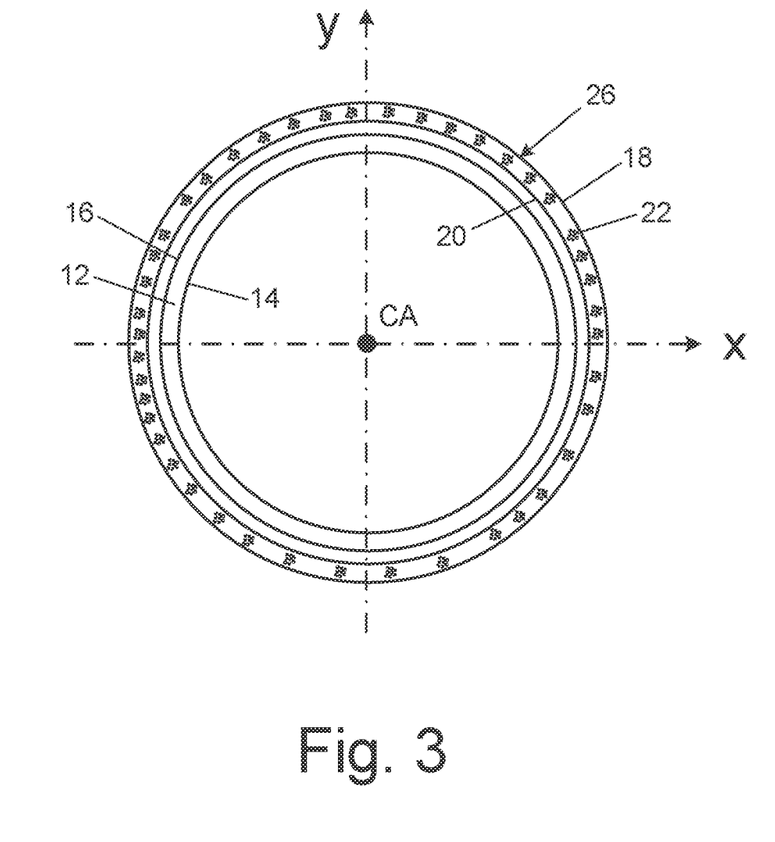
FIG. 3 is a cross-sectional view of the composite to metallic joint taken along line B-B of FIG. 2.
Figure 4:
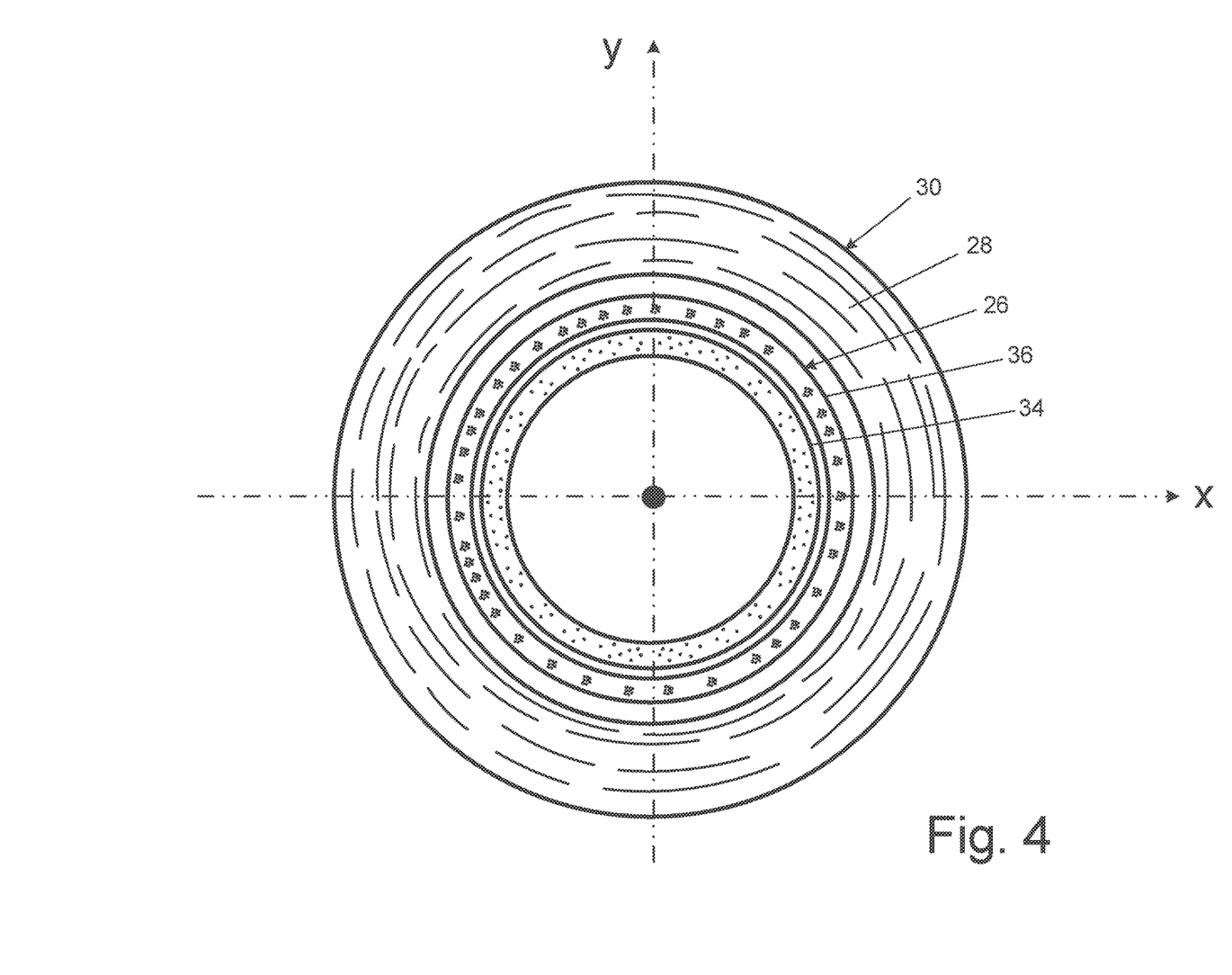
FIG. 4 is a cross-sectional view of the composite to metallic joint taken along line C-C of FIG. 2.

FIGS. 2-4 will be discussed together since they show different cross-sectional views joint 10. FIG. 2 is an axial cross-sectional view of composite to metallic joint 10 taken along line A-A of FIG. 1. FIG. 3 is a cross-sectional view of composite to metallic joint 10 taken along line B-B of FIG. 2. FIG. 4 is a cross-sectional view of composite to metallic joint 10 taken along line C-C of FIG. 2. Composite to metallic joint 10 includes metallic component 12, composite component 18, and composite reinforcement 28. Metallic component 12 includes metallic component first surface 14, metallic component second surface 16, metallic groove 34, metallic groove first slope 36, metallic groove flat region 37, and metallic groove second slope 38. Profile of metallic groove 34, described by segments 36, 37 and 38, is shown as a representative embodiment. Other embodiments of metallic groove profile 34 can include combination of different segments including, for example, curved segments with either uniform or variable radii and linear segments with either slopped or flat geometries. Composite component 18 includes composite component first surface 20, composite component second surface 22, composite component cavity 24, composite component fibers 26, composite groove 40, composite groove first slope 42, composite groove flat region 43, and composite groove second slope 44. Similarly, to the metallic groove profile, profile of composite groove 40, described by segments 42, 43 and 44, is shown as a representative embodiment. Other embodiments of composite groove profile 40 can include combination of different segments including, for example, curved segments with either uniform or variable radii and linear segments with either slopped or flat geometries. Composite component reinforcement 28 includes composite fiber-reinforced layers, fabric or other variants of fiber reinforcement 30. Metallic groove 34 and composite groove 40 form reduced circumference portion 32 of joint 10.

As best shown in FIG. 3, metallic component 12 has a smaller circumference than composite component 18. Metallic groove 34, as best shown in FIG. 4, has a smaller circumference than composite groove 40 which has a smaller circumference than composite reinforcement 28. Metallic component 12 has metallic component first surface 14 nearest to the z axis and central axis CA and metallic component second surface 16 opposite the metallic component first surface 14. As shown in FIG. 3, metallic component first surface 14 is a radially inner surface of metallic component 12, and metallic component second surface 16 is a radially outer surface of metallic component 12. Composite component 18 has a composite component first surface 20 nearest to the z axis and central axis CA and composite component second surface 22 opposite the composite component first surface 20. Composite component first surface 20 is a radially inner surface of composite component 18 and composite component second surface 22 is a radially outer surface of composite component 18.

Fiber-reinforced composite component 18 can be formed using thermoplastic polymeric matrix or thermoset polymeric matrix. Carbon, glass or organic (e.g., Kevlar) fibers or any of their combinations can be used, among others, as fiber reinforcement. Composite component 18 can be formed by multiple methods of making composites known to those of skill in the art including rolling, filament-winding, automated fiber placement (AFP), braiding, extrusion, or any other suitable method known to those of skill in the art. During forming, the first end of composite component 18 can be formed to be hollow, thus enabling formation of composite component cavity 24. Composite component cavity 24 is a region of composite component 18 which is hollow and can receive a first end of metallic component 12. Composite component 18 includes composite component fibers 26. Rolling can be an especially beneficial method of making composite component 18 as rolling provides an efficient opportunity to place a majority of composite component fibers 26 in close alignment with central axis CA, thus enabling a higher axial load capability for composite component 18.

Inside composite reinforcement 28 are composite reinforcement fibers 30. Composite reinforcement fibers 30 are orientated substantially circumferentially around central axis CA of metallic component 12. In such an embodiment, composite reinforcement fibers 30 are orientated at 90 degrees with respect to the center axis. In other embodiments, composite reinforcement fibers 30 can alternatively be orientated between $+\alpha$ and $-\alpha$, where $\alpha$ is more than 60 degrees, or their combination with 90-degree orientations with respect to the center axis. The angle $\alpha$ can alternatively be more than 70 degrees or more than 80 degrees.

Reduced circumference portion 32 is defined by a region where a circumference of metallic component 12 and a circumference of composite component 18 are reduced. The circumferences of metallic component 12 and composite component 18 can be reduced in the region where metallic groove 34 and composite groove 40 are formed. Metallic groove 34 includes metallic groove first slope 36 and metallic groove second slope 38. Metallic first slope 36 is a region of metallic component 12 wherein metallic component 12 progresses radially inward with respect to central axis CA of metallic component 12 to metallic groove flat region 37. Metallic second slope 38 is a region of metallic component 12 wherein metallic component 12 progresses radially outward from metallic groove flat region 37 with respect to central axis CA of metallic component 12. Metallic groove flat region 37 is substantially parallel to central axis CA and is axially between metallic groove first slope 36 and metallic groove second slope 38.

Composite groove 40 includes composite groove first slope 42 and composite groove second slope 44. Composite groove first slope 42 is a region of composite component 18 wherein composite component 18 progresses radially inward to composite groove flat region 43 with respect to central axis CA of metallic component 12. Composite second slope 44 is a region of composite component 18 wherein composite component 18 progresses radially outward from composite groove flat region 43 with respect to central axis CA of metallic component 12. Composite groove flat region 43 is axially between composite groove first slope 42 and composite groove second slope 44 and is substantially parallel to central axis CA of metallic component 12.

At least a portion of metallic component second surface 16 contacts a portion of composite component first surface 20. The region at which metallic groove 34 and composite groove 40 contact can be between metallic groove first slope 36 and composite groove first slope 42 and/or between metallic groove second slope 38 and composite groove second slope 44, depending on the direction of applied axial force. By having metallic groove 34 contact composite groove 40, metallic component 12 cannot slip out of composite component cavity 24 of composite component 18 without first deflecting composite component 18. Deflection of composite component 18 is hindered by composite reinforcement 28.

A portion of composite reinforcement 28 contacts at least a portion of composite component second surface 22 of composite groove 40. Composite reinforcement 28 can contact second surface 22 of composite groove 40 at any combination of composite groove first slope 42, composite groove flat region 43, and composite groove second slope 44. Composite reinforcement 28 hinders radial deflection of composite component 18, in turn hindering the ability of metallic component 12 to slip out from composite component cavity 24 of composite component 18. Composite reinforcement 28 has composite reinforcement fibers 30 therein. Composite reinforcement fibers 30 are orientated within composite reinforcement 28 principally circumferentially about center axis CA of metallic component 12. In such an embodiment, composite reinforcement fibers 30 are orientated at 90 degrees with respect to the center axis. In other embodiments, composite reinforcement fibers 30 can alternatively be orientated between $+\alpha$ and $-\alpha$, where $\alpha$ is more than 60 degrees, or their combination with 90-degree orientations with respect to the center axis. $\alpha$ can alternatively be more than 70 degrees, or more than 80 degrees. By orientating composite reinforcement fibers 30 circumferentially, composite reinforcement 28 is better able to resist radial displacements or deformations of composite component 18.

When an axial force is applied to metallic component 12, metallic groove 34 pushes radially outward against composite groove 40 due to either metallic groove first slope 36 or metallic groove second slope 38 of metallic groove 34, depending on the direction of the applied force, forcefully contacting composite groove first slope 42 or composite groove second slope 44 of composite groove 40. When the radially outward force is applied to composite groove 40, composite groove 40 transfers this force to composite reinforcement 28. Composite reinforcement 28 in turn resists this radially outward force as composite reinforcement fibers 30 are orientated circumferentially. Since metallic groove 34 cannot deflect composite groove 40 outwards, the axial force is instead transferred down the length of composite component 18. At the opposite end of composite component 18, another composite to metallic joint can be present.

Figure 5A:
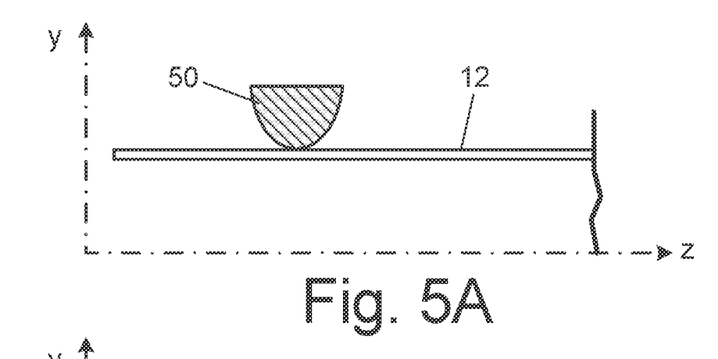
FIG. 5A is an axial cross-sectional view of a metallic component prior to formation of a groove.
Figure 5B:
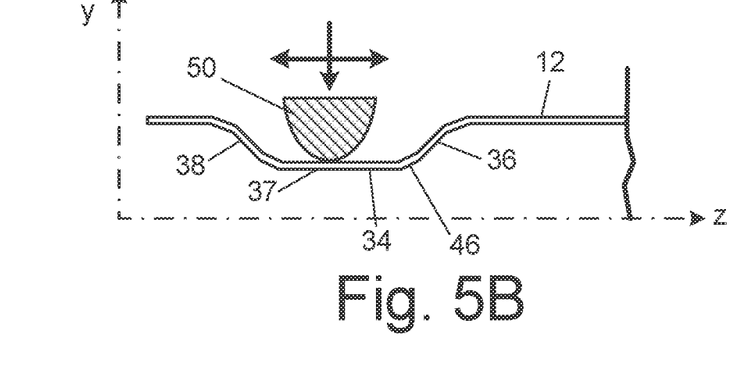
FIG. 5B is an axial cross-sectional view of the metallic component of FIG. 5A after the formation of a U-shaped groove profile.
Figure 5C:
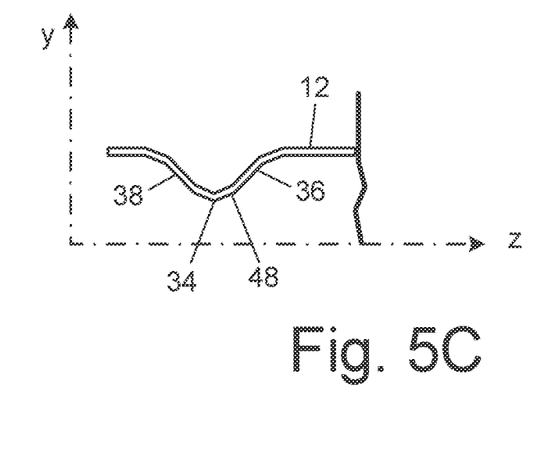
FIG. 5C is an axial cross-sectional view of the metallic component of FIG. 5A after the formation of a V-shaped groove profile.

FIGS. 5A-5C will be discussed here together. FIG. 5A is an axial cross-sectional view of metallic component 12 prior to formation of metallic groove 34. FIG. 5B is an axial cross-sectional view of metallic component 12 of FIG. 5A after the formation of U-shaped groove profile 46. FIG. 5C is an axial cross-sectional view of metallic component 12 of FIG. 5A after the formation of V-shaped groove profile 48.

Metallic groove 34 can formed by application of a radially inward force by forming tip 50. Forming tip 50 and/or metallic component 12 can be heated during formation of metallic groove 34. Heating forming tip 50 and/or metallic component 12 can improve the ability to work the metal. This application of radially inward force can be done while either metallic component 12 or forming tip 50 rotates circumferentially around the z axis. Forming tip 50 can be the shape of metallic groove 34, enabling formation of metallic groove 34 into metallic component 12 by moving forming tip radially without axially moving forming tip 50 with respect to the z axis. Alternatively, forming tip 50 can be smaller than metallic groove 34. If forming tip 50 is smaller than metallic groove 34, forming tip 50 can move axially and radially with respect to the z axis of metallic component 12 when forming metallic groove 34. Forming tip 50 can also comprise a plurality of forming tips which each exert a radially inward pressure against metallic component 12.

As shown in FIG. 5B, metallic groove 34 can be U-shaped groove profile 46, comprising at least a curved segment and a linear (flat) segment. In the z direction, U-shaped groove profile 46 comprises metallic groove first slope 36, metallic groove flat region 37, and metallic groove second slope 38. Metallic groove first slope 36 and metallic groove second slope 38 can have the same slopes but with opposite signs. Slopes 38 and 36 can be symmetric or non-symmetric.

As shown in FIG. 5C, metallic groove 34 can instead be V-shaped groove profile 48, comprising at least a curved segment. In the z direction, V-shaped groove profile 48 comprises metallic groove first slope 36 and metallic groove second slope 38. As such, V-shaped groove profile 48 has no substantial portion parallel to the z axis. metallic groove first slope 36 and metallic groove second slope 38 can have the same slopes but with opposite signs. Slopes 38 and 36 of the V-shaped groove 48 can be symmetric or non-symmetric. The slopes of V-shaped groove profile 48 can be steeper than the U-shaped groove. U-shaped groove profile 46 enables more contact surface between metallic groove 34 and composite groove 40. V-shaped groove profiles 48 can reduce a width of joint 10 in the z axis. Note that in addition to considered U-shaped and V-shaped groove profiles, other groove profiles can also be used in other embodiments and consist as a combination of different segments having either curved or linear geometries. The curved segments can have either uniform or non-uniform curvatures.

Figure 6A:
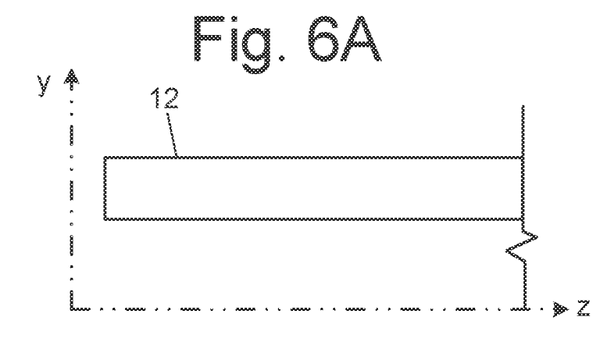
FIG. 6A is an axial cross-sectional view of a metallic component prior to machining of a metallic groove.
Figure 6B:
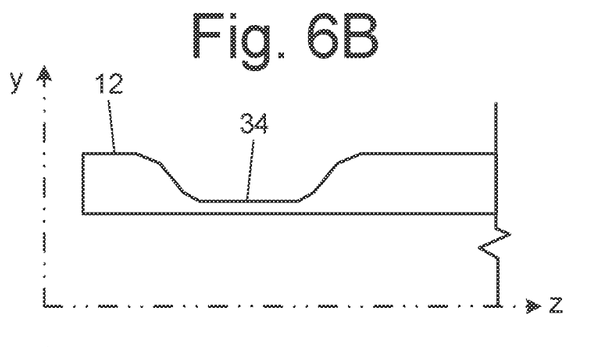
FIG. 6B is an axial cross-sectional view of the metallic component of FIG. 6A after the machining of the metallic groove.
Figure 6C:
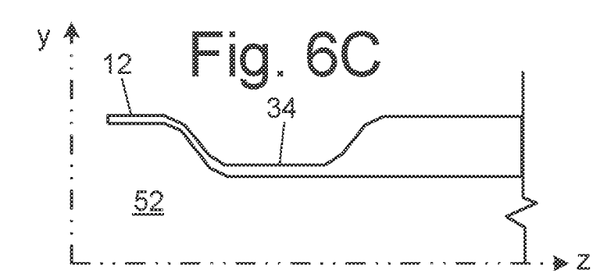
FIG. 6C is an axial cross-sectional view of the metallic component of FIG. 6A after the machining of the metallic groove and a first end.
Figure 6D:
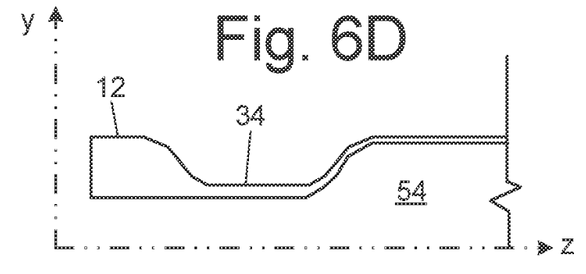
FIG. 6D is an axial cross-sectional view of the metallic component of FIG. 6A after the machining of the metallic groove and a second end.
Figure 6E:
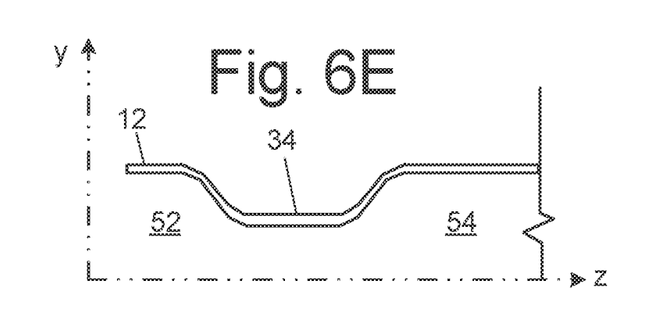
FIG. 6E is an axial cross-sectional view of the metallic component of FIG. 6A after the machining of the metallic groove and both a first and second ends.

FIGS. 6A-6E will be discussed together. FIG. 6A is an axial cross-sectional view of metallic component 12 prior to machining metallic groove 34. FIG. 6B is an axial cross-sectional view of metallic component 12 of FIG. 6A after the machining of metallic groove 34. FIG. 6C is an axial cross-sectional view of metallic component 12 of FIG. 6A after the machining of metallic groove 34 and first machined end 52. FIG. 6D is an axial cross-sectional view of metallic component 12 of FIG. 6A after the machining of metallic groove 34 and second machined end 54. FIG. 6E is an axial cross-sectional view of metallic component 12 of FIG. 6A after the machining of metallic groove 34 and both first machined end 52 and second machined end 54.

Metallic groove 34 can be formed by machining away material of metallic component 12 to form reduced circumference portion 32. As can be seen in FIG. 6A, when machining away material to form metallic groove 34, metallic component 12 can be a thicker tube. In other examples, metallic component can also be a solid metallic rod. Metallic component 12 can be formed of any metallic or alloy material known to those of skill in the art to be machinable. In some embodiments, metallic component 12 can be formed of aluminum or titanium to take advantage of its resistance to corrosion and high strength to weight ratio. In other embodiments, metallic component 12 can be formed of steel. Metallic groove 34 can be machined into metallic component 12 on metallic component second surface 16 of metallic component 12. In the embodiment shown in FIG. 6B, metallic groove 34 is U-shaped groove profile 46. U-shaped groove profile 46 comprises, among other components mentioned above, metallic groove flat region 37. Metallic groove flat region 37 can be substantially thin relative to the overall wall thickness of metallic component 12 shown in FIG. 6A. Metallic groove 34 can also be a V-shaped groove profile 48 as discussed above with respect to FIG. 5C.

As can be seen in FIG. 6C, first machined end 52 can be machined away along with metallic groove 34. First machined end 52 is machined on metallic component first surface 14 of a first end of metallic component 12. The first end of metallic component 12 is typically the end of metallic component 12 that is inserted into composite component cavity 24 of composite component 18. A thickness of the first end of metallic component 12 after machining first machined end 52 can be substantially thin relative to an original wall thickness of metallic component 12, thereby reducing the overall weight of metallic component 12.

As can be seen in FIG. 6D, second machined end 54 can be machined away along with metallic groove 34. Second machined end 54 is machined on metallic component first surface 14 of a second end of metallic component 12 which could be connected to a larger assembly. A thickness of the second end of metallic component 12 after machining second machined end 54 can be substantially thin relative to an original wall thickness of metallic component 12. Second machined end 54 could be threaded to enable a threaded connection to the larger assembly. As can be seen in FIG. 6E, both first machined end 52 and second machined end 54 can be machined into metallic component 12 as they are on opposite ends of metallic groove 34. The benefits to machining each of these sections is discussed above, with respect to FIGS. 6C and 6D.

Figures 7A, 7B:
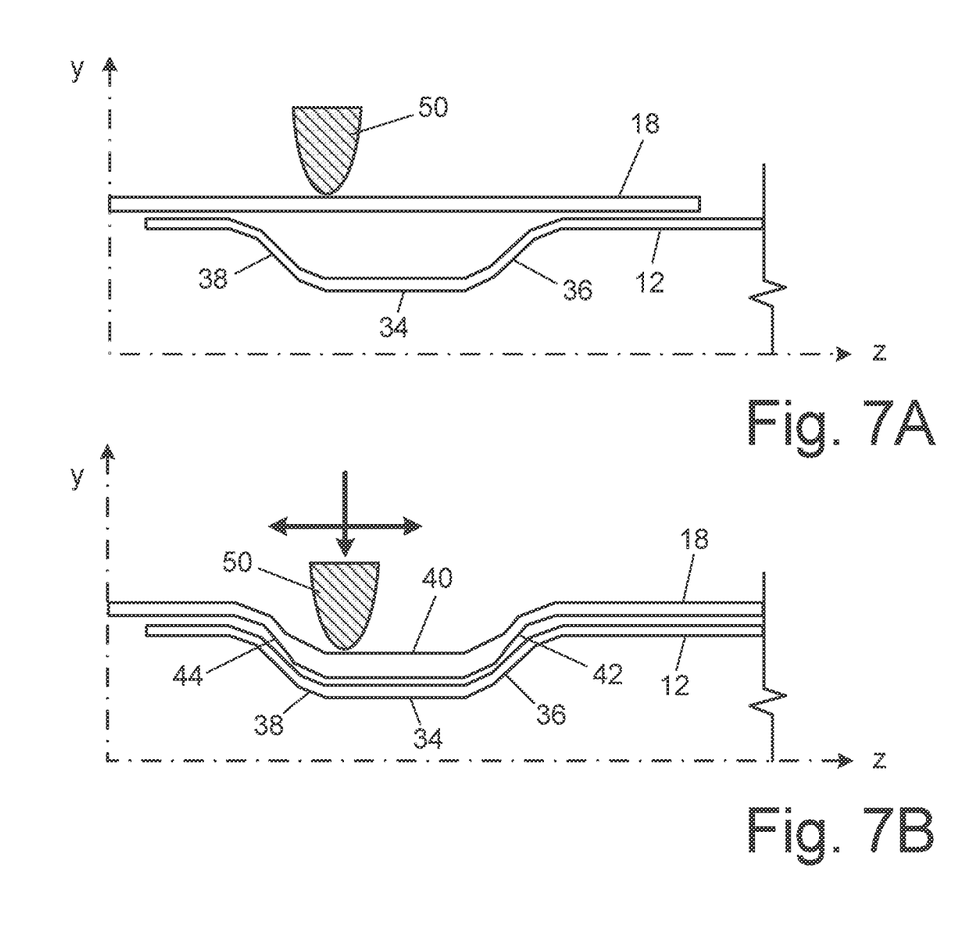
FIG. 7A is an axial cross-sectional view of a metallic component with a metallic groove formed therein and a composite component around the metallic groove prior to formation of a groove in the composite component.
FIG. 7B is an axial cross-sectional view of FIG. 7A after the formation of the groove in the composite component.

FIGS. 7A-7B will be discussed together. FIG. 7A is an axial cross-sectional view of metallic component 12 with metallic groove 34 formed therein and composite component 18 around metallic groove 34 prior to formation of composite groove 40 in composite component 18. FIG. 7B is an axial cross-sectional view of FIG. 7A after the formation of composite groove 40 in composite component 18.

Composite groove 40 can be formed by the application of a radially inward force by forming tip 50 onto composite component 18 over metallic groove 34 of metallic component 12. When the force is applied to composite component 18, a portion of composite component 18 extends radially inward into metallic groove 34. A cross-sectional profile of composite groove 40 after formation is complementary to a cross-sectional profile of metallic groove 34. After formation, composite groove 40 takes the shape of metallic groove 34. Composite groove 40 is a portion of composite component 18 which has a reduced circumference. When metallic groove 34 is U-shaped groove profile 46, composite groove 40 will be U-shaped as well, therefore composite groove 40 will include composite groove first slope 42, composite groove flat region 43, and composite groove second slope 44. The slopes of composite groove first slope 42 and composite groove second slope 44 can be equal, but opposite in sign. Alternatively, when metallic groove 34 is V-shaped groove profile 48, composite groove 40 will include composite groove first slope 42 and composite groove second slope 44. The slopes of composite groove first slope 42 and composite groove second slope 44 can be equal, but opposite in sign. Note that the same approach can be similarly applied to other groove profiles, different than U-shaped or V-shaped.

Figure 8:
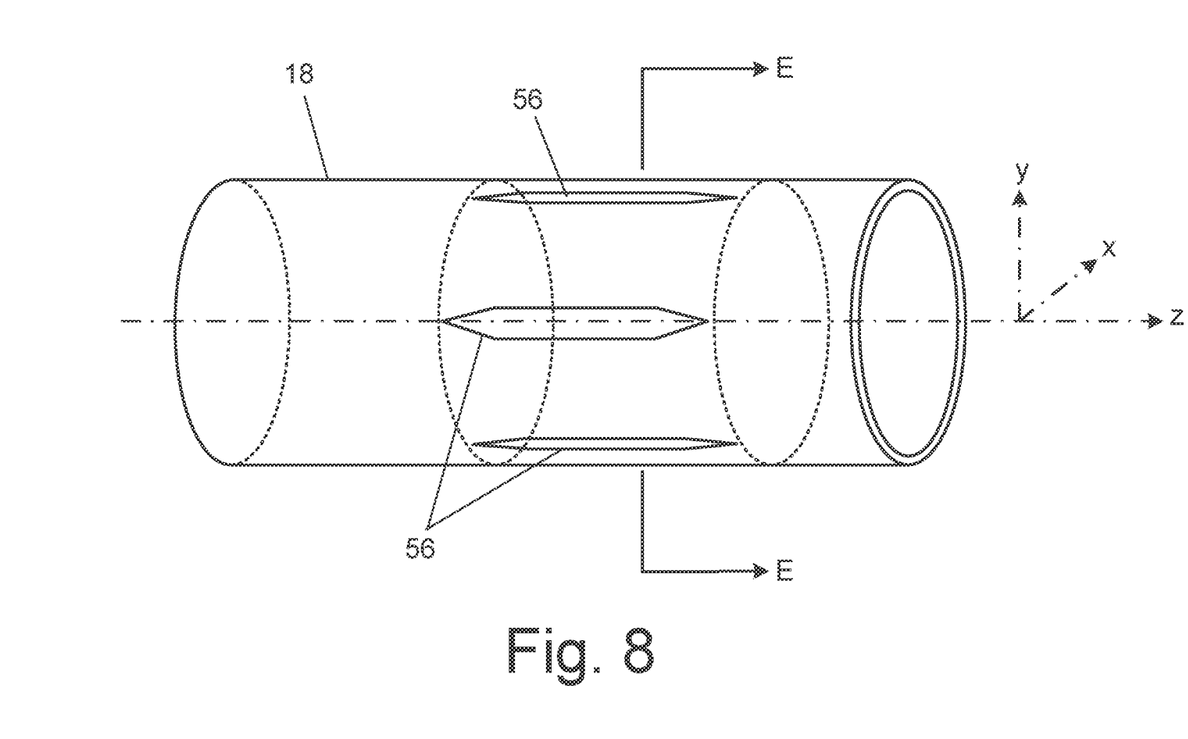
FIG. 8 is a perspective view of a composite component with elongated openings formed in the composite component.
Figure 9A:
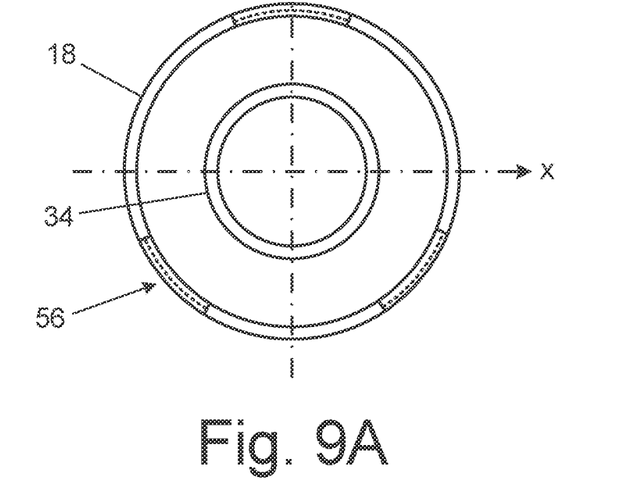
FIG. 9A is a cross-sectional view of the composite component taken along line E-E in FIG. 8 and a metallic component disposed radially within the composite component.
Figure 9B:
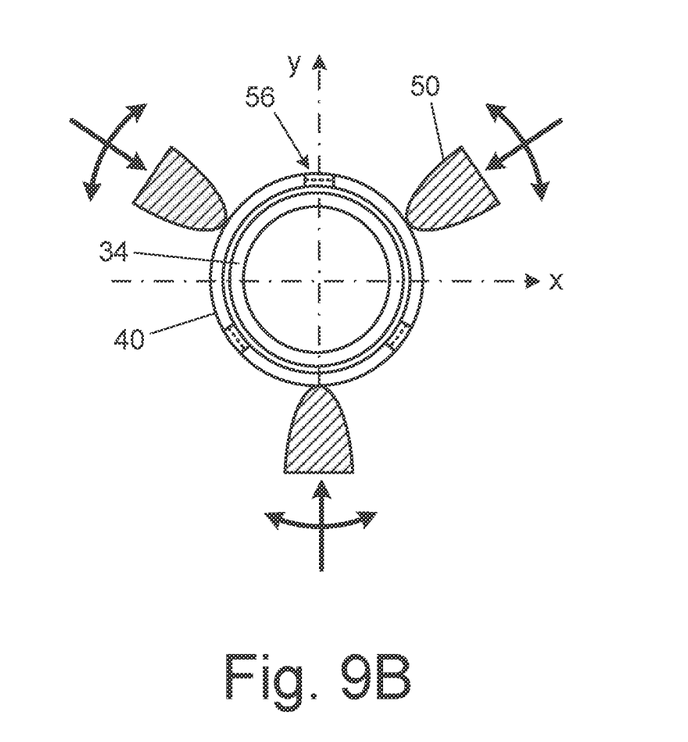
FIG. 9B is a cross-sectional view of the composite component of FIG. 9A after application of a radially inward force.

Forming tip 50 can be heated if thermoplastic polymeric matrix is used in composite component 18. This application of radially inward force can be done while either composite component 18 or forming tip 50 are spinning circumferentially around the z axis. Forming tip 50 can have the shape of composite groove 40. This would enable forming a groove into composite component 18 by moving forming tip radially without moving forming tip 50 axially with respect to the z axis. Alternatively, forming tip 50 can be smaller than composite groove 40. When forming tip 50 is smaller than composite groove 40, forming tip 50 will move both radially and axially against composite component 18 with respect to the z axis of composite component 18 when forming composite groove 40. Formation of composite groove 40 leads to a regional thickening of composite component 18 in the region of composite groove 40. The regional thickening of composite component 18 in the region of composite groove 40 is caused by the fact that composite material is not removed and as such the same amount of material of the larger circumference is now forced into a smaller circumference, increasing the wall thickness. Forming tip 50 can also comprise a plurality of forming tips which each exert a radially inward pressure FIGS. 8-9B will be discussed together. FIG. 8 is a perspective view of composite component 18 with through-thickness elongated openings 56 cut in composite component 18 prior to forming the composite groove. FIG. 9A is a cross-sectional view of composite component 18 taken along line E-E in FIG. 8 before forming composite groove 40 and metallic component 12 disposed radially within composite component 18. FIG. 9B is a cross-sectional view of composite component 18 of FIG. 9B after application of a radially inward force to composite component 18.

Composite component 18 can have elongated openings 56 cut through thickness therein. Elongated openings 56 are parallel to center axis CA and each elongated opening 56 is elongated in the axial direction. Elongated openings 56 can be cut by a cutting implement which can include a laser, a knife, a water jet, or a combination thereof. Further cutting implements known to those of skill in the art can also be used. Elongated openings 56 can be tapered at both ends of elongated openings 56. Tapering both of the ends of elongated openings 56 allows for a proportional reduction in removed material in composite groove first slope 42, composite groove flat portion 43, and composite groove second slope 44 of composite groove 40. This tapering allows more material to be removed as the circumference is reduced further, thus a wall thickness of the composite component 18 varies less, in contrast to the example of FIG. 7B where the wall thickness of the composite component 18 increases after composite groove 40 formation. After cutting elongated openings 56 with a cutting implement, a radially inward force is applied to composite component 18 by forming tip 50. Forming tip 50 pushes radially inward on composite component 18 over metallic groove 34, thus forming composite groove 34. After application of force by forming tip 50, a portion of composite component 18 extends radially inward into metallic groove 34. When metallic groove 34 is U-shaped groove profile 46, composite groove 40 will be U-shaped as well, therefore composite groove 40 will include composite groove first slope 42, composite groove flat region 43, and composite groove second slope 44. The slopes of composite groove first slope 42 and composite groove second slope 44 can be equal, but opposite in sign. Alternatively, when metallic groove 34 is V-shaped groove profile 48, composite groove 40 will include composite groove first slope 42, and composite groove second slope 44. The slopes of composite groove first slope 42 and composite groove second slope 44 can be equal, but opposite in sign. After application of the radially inward force and formation of composite groove 40, elongated openings 56 may still be visible or may be closed.

Forming tip 50 can be heated in case of thermoplastic polymeric matrix of composite component 18. The application of radially inward force can be done while either composite component 18 or forming tip 50 are spinning circumferentially around the z axis. Forming tip 50 can be the shape of composite groove 40 which allows forming tip 50 to form a groove into composite component 18 by moving forming tip 50 radially against composite component 18 without moving forming tip 50 axially with respect to the z axis. Alternatively, forming tip 50 can be smaller than composite groove 40. When forming tip 50 is smaller than composite groove 40, forming tip 50 is moved both radially and axially against composite component 18 with respect to the z axis of composite component 18 when forming composite groove 40. A plurality of forming tips 50 can be used to form composite groove 40, with each forming tip 50 exert a radially inward pressure. Because elongated openings 56 removed material prior to the formation of composite groove 40, formation of composite groove 40 leads to less regional thickening of composite component 18 near composite groove 40.

Figure 10:
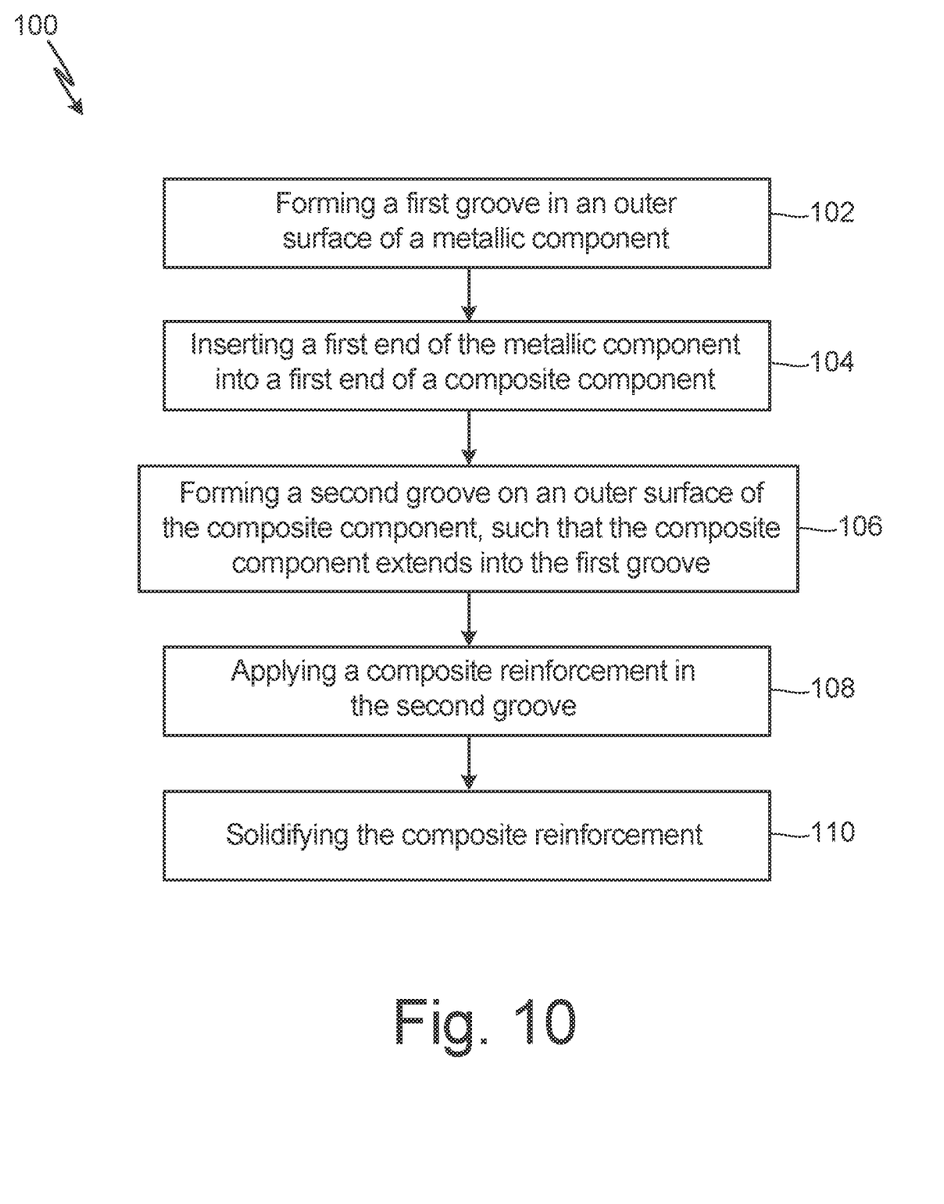
FIG. 10 is a flowchart of a method of manufacturing a composite to metallic joint.

FIG. 10 is a flowchart of a method of manufacturing composite to metallic joint 10. Method 100 includes steps 102-110. Step 102 includes forming metallic groove 34 in metallic component second surface 16 of metallic component 12. Step 104 includes inserting a first end of metallic component 12 into in a first end of a composite component 18. Step 106 includes forming composite groove 40 on composite groove second surface 22 of composite component 18, such that composite component 18 extends into metallic groove 34. Step 108 includes applying composite reinforcement 28 in composite groove 34. Step 110 includes solidifying composite reinforcement 28.

Step 102 includes forming metallic groove 34 in metallic component second surface 16 of metallic component 12. As discussed above with respect to FIGS. 5A-6E, metallic groove 34 can be formed in metallic component second surface 16 of metallic component 12. Metallic groove 34 can be U-shaped groove profile 46 or V-shaped groove profile 48 or other suitable groove profiles. Metallic groove 34 can be formed by the application of a radially inward force by forming tip 50 onto metallic component 12. Metallic groove 34 can also be formed by machining away material from metallic component second surface 16 of metallic component 12.

Step 104 includes inserting a first end of metallic component 12 into composite component cavity 24 of composite component 18. Composite component cavity 24 can be formed into a first end of composite component 18 to enable metallic component 12 to be put therein. Composite component cavity 24 can be formed when creating composite component 18. For example, composite component 18 can be formed by rolling or wrapping composite fabric or tows into a tube with composite component cavity 24 inside the tube. When inserting the first end of metallic component 12 into composite component cavity 24, metallic groove 34 should be at least partially encompassed by composite component 18. Without at least partially encompassing metallic component 12, step 106 cannot be completed.

Step 106 includes forming composite groove 40 on composite component second surface 22 of composite component 18, such that composite component 18 extends into metallic groove 34. As discussed above with respect to FIGS. 7A-9B, composite groove 40 can be formed in composite component second surface 22 of composite component 18. Composite groove 40 conforms to metallic groove 34, and as such can be U-shaped groove profile 46 or V-shaped groove profile 48 depending on the profile of metallic groove 34. Composite groove 40 can be formed by application of a radially inward force by forming tip 50 onto composite component 18. Forming tip 50 can be heated. Heating forming tip 50 can be especially important for thermoplastic composites.

Step 108 includes applying composite reinforcement 28 around composite groove 40. As discussed above with respect to FIGS. 1, 2, and 4, composite reinforcement 28 is substantially hoop shaped and has composite reinforcement fibers 30 therein. Composite reinforcement fibers 30 are orientated principally circumferentially, which enables composite reinforcement 28 to better resist radial displacements.

Composite reinforcement 28 can be formed from thermoplastic composites or thermoset composites. Composite reinforcement fibers 30 of composite reinforcement 28 can be made of glass, carbon, or any other suitable material known to those of skill in the art.

Step 110 includes solidifying composite reinforcement 28. Composite reinforcement 28 can be made of thermoplastic composites or thermoset composites. Thermoplastic composite reinforcements 28 are consolidated when solidifying. Thermoset composite reinforcements 28 are cured for solidification. Thermoset composite component 18 with formed groove can be partially cured first, and then can be cured together with reinforcement 28 to finish solidifying. Consolidation can include cooling the thermoplastic composite upon forming desired shape. Curing includes heating the composite over time to allow the polymers to form crosslinking structures.

DISCUSSION OF POSSIBLE EMBODIMENTS

A method of forming a joint between a composite component and a metallic component according to an exemplary embodiment of this disclosure, among other things includes forming a first groove in an outer surface of the metallic component on a first end of the metallic component. The first groove extends circumferentially on the outer surface relative to a center axis of the metallic component, the first groove extends radially inward from the outer surface relative the center axis. The method further includes inserting the first end of the metallic component into a first end of the composite component and forming a second groove on the composite component over the first groove of the metallic component such that the composite component extends radially inward into the first groove of the metallic component. The method further includes applying a composite hoop reinforcement in the second groove in a circumferential direction and solidifying the composite component and the composite hoop reinforcement.

A further embodiment of the foregoing method of forming a joint between a composite component and a metallic component, wherein the composite component and the composite hoop reinforcement comprise a fiber-reinforced composite with thermoset polymeric matrix and solidifying the composite component and the composite hoop reinforcement. The solidifying includes at least one of curing both the composite component and the composite hoop reinforcement and curing the composite component partially, applying the composite hoop reinforcement, curing both the composite component and the composite hoop reinforcement.

A further embodiment of any of the foregoing methods of forming a joint between a composite component and a metallic component, wherein the composite component and the composite hoop reinforcement comprise a fiber-reinforced composite with thermoplastic polymeric matrix and solidifying the composite component and the composite hoop reinforcement. Solidifying includes applying cooling to consolidate the thermoplastic composite component and the composite hoop reinforcement.

A further embodiment of any of the foregoing methods of forming a joint between a composite component and a metallic component, wherein forming the first groove on the outer surface of the metallic component includes applying a radially inward force by a forming tip to the outer surface of the metallic component and moving the forming tip along the central axis of the metallic component.

A further embodiment of any of the foregoing methods of forming a joint between a composite component and a metallic component, wherein forming the first groove of the metallic component comprises machining the first groove into the outer surface of the metallic component.

A further embodiment of any of the foregoing methods of forming a joint between a composite component and a metallic component, wherein forming the second groove on the composite component includes applying a radially inward force by a forming tip to an outer surface of the composite component and moving the forming tip along the central axis.

A further embodiment of any of the foregoing methods of forming a joint between a composite component and a metallic component, wherein the forming tip is heated if the composite component comprises thermoplastic matrix.

A further embodiment of any of the foregoing methods of forming a joint between a composite component and a metallic component, wherein forming the second groove on the composite component includes cutting elongated openings through a thickness of the composite component, wherein each elongated opening is circumferentially spaced about the composite component from the other elongated openings, and wherein the elongated openings are parallel to the center axis and each elongated opening is elongated in the axial direction, applying a radially inward force by a forming tip to an outer surface of the composite component between the elongated openings, and moving the forming tip against the outer surface of the composite component along the central axis.

A further embodiment of any of the foregoing methods of forming a joint between a composite component and a metallic component, wherein the composite hoop reinforcement includes a plurality of fibers with a fiber orientation of at least one of a circumferential orientation, an orientation of $+\alpha$, and an orientation of $-\alpha$, where $\alpha$ is more than 60 degrees with respect to the center axis.

A method of forming a joint between two rods, according to an exemplary embodiment of this disclosure, among other things includes forming a groove in an outer surface of a first rod proximate a first end of the first rod, where the groove extends circumferentially on the outer surface relative to a center axis of the first rod, and the groove extends radially inward from the outer surface relative the center axis. The method further includes forming a cavity in a first end of a second rod and inserting the first end of the first rod into the cavity of the second rod, and the groove of the first rod is within the cavity. The method further includes reducing a diameter of the second rod proximate the first end of the second rod to form a reduced diameter portion in the first end of the second rod, the reduced diameter portion is formed over the groove of the first rod and the reduced diameter portion extends radially inward into the groove of the first rod. The method further includes applying a composite wrap circumferentially around the reduced diameter portion of the second rod, where the composite wrap comprises a plurality of fibers with a circumferential fiber orientation and solidifying the composite wrap.

A further embodiment of the foregoing method of forming a joint between two rods, wherein forming the groove in the outer surface of the first rod includes applying a radially inward force by a forming tip while rotating the first rod.

A further embodiment of any of the foregoing methods of forming a joint between two rods, wherein forming the groove in the outer surface of the first rod includes machining the groove into the first rod.

A further embodiment of any of the foregoing methods of forming a joint between two rods, wherein the first rod comprises a circular cross-section.

A further embodiment of any of the foregoing methods of forming a joint between two rods, wherein the second rod comprises a circular cross-section.

An assembly according to an exemplary embodiment of this disclosure, among other possible things includes a metallic component which includes a first end opposite a second end, an outer surface extending circumferentially about a center axis and extending axially from the first end toward the second end, and a groove in the outer surface of the metallic component proximate the first end and extending radially inward relative the outer surface of the metallic component. The assembly further includes a composite component which includes a first end opposite a second end, a cavity in the first end of the composite component, where the first end and the groove of the metallic component are inside the cavity, and a reduced circumference portion in the composite component over the groove of the metallic component and extending into the groove. The assembly further includes a composite hoop reinforcement radially outward from the reduced circumference portion and axially over the reduced circumference portion. The composite hoop extends circumferentially around the reduced diameter portion A further embodiment of the foregoing assembly, wherein a cross-sectional shape of the groove includes at least one of a curved region and a linear region.

A further embodiment of any of the foregoing assemblies, wherein a cross-sectional shape of the groove includes curved regions.

A further embodiment of any of the foregoing assemblies, wherein the composite component comprises a plurality of fibers therein, embedded in a polymeric, and wherein the fibers are at least one of carbon, glass, and organic.

A further embodiment of any of the foregoing assemblies, wherein the composite hoop reinforcement comprises a plurality of fibers therein, embedded in a polymeric matrix with a fiber orientation of at least one of a circumferential orientation, and an orientation of $+\alpha$, and an orientation of $-\alpha$, where $\alpha$ is more than 60 degrees with respect to the center axis of the metallic component, and wherein the fibers are at least one of carbon, glass, and organic.

A further embodiment of any of the foregoing assemblies, wherein the reduced circumference portion of the composite component comprises a second cross-sectional profile that is complementary to a first cross-sectional profile of the groove in the outer surface of the metallic component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a joint between a composite component and a metallic component, the method comprising:
   forming a first groove in an outer surface of the metallic component on a first end of the metallic component, wherein the first groove extends circumferentially on the outer surface relative to a central axis of the metallic component, and wherein the first groove extends radially inward from the outer surface relative the central axis;
   inserting the first end of the metallic component into a first end of the composite component;
   forming a second groove on the composite component over the first groove of the metallic component by applying a radially inward force by a forming tip to an outer surface of the composite component and moving the forming tip along the central axis, such that the composite component extends radially inward into the first groove of the metallic component;
   applying a composite hoop reinforcement in the second groove in a circumferential direction; and
   solidifying the composite component and the composite hoop reinforcement.

2. The method of claim 1, wherein:
   the composite component and the composite hoop reinforcement comprise a fiber-reinforced composite with thermoset polymeric matrix; and
   solidifying the composite component and the composite hoop reinforcement comprises at least one of:
      curing both the composite component and the composite hoop reinforcement; and
      curing the composite component partially, applying the composite hoop reinforcement, and curing both the composite component and the composite hoop reinforcement.

3. The method of claim 1, wherein:
   the composite component and the composite hoop reinforcement comprise a fiber-reinforced composite with thermoplastic polymeric matrix; and
   solidifying the composite component and the composite hoop reinforcement comprises applying cooling to consolidate the thermoplastic composite component and the composite hoop reinforcement.

4. The method of claim 3, wherein the forming tip is heated.

5. The method of claim 1, wherein forming the first groove on the outer surface of the metallic component comprises:
   applying a radially inward force by the forming tip to the outer surface of the metallic component; and
   moving the forming tip along the central axis of the metallic component.

6. The method of claim 1, wherein forming the first groove of the metallic component comprises machining the first groove into the outer surface of the metallic component.

7. The method of claim 1, wherein forming the second groove on the composite component comprises:
   cutting elongated openings through a thickness of the composite component, wherein each elongated opening is circumferentially spaced about the composite component from the other elongated openings, and wherein the elongated openings are parallel to the central axis and each elongated opening is elongated in an axial direction;
   applying the radially inward force by the forming tip to the outer surface of the composite component between the elongated openings; and
   moving the forming tip against the outer surface of the composite component along the central axis.

8. The method of claim 1, wherein the composite hoop reinforcement comprises a plurality of fibers with a fiber orientation of at least one of a circumferential orientation, an orientation of +α, and an orientation of –α, where α is more than 60 degrees with respect to the central axis.

9. A method of forming a joint between two rods, the method comprising:
   forming a groove in an outer surface of a first rod proximate a first end of the first rod, wherein the groove extends circumferentially on the outer surface relative to a central axis of the first rod, and wherein the groove extends radially inward from the outer surface relative the central axis;
   forming a cavity in a first end of a second rod;
   inserting the first end of the first rod into the cavity of the second rod, wherein the groove of the first rod is within the cavity;
   reducing a diameter of the second rod proximate the first end of the second rod to form a reduced diameter portion in the first end of the second rod by applying a radially inward force by a forming tip to an outer surface of the second rod and moving the forming tip along the central axis, wherein the reduced diameter portion is formed over the groove of the first rod and the reduced diameter portion extends radially inward into the groove of the first rod;
   applying a composite wrap circumferentially around the reduced diameter portion of the second rod, wherein the composite wrap comprises a plurality of fibers with a circumferential fiber orientation; and
   solidifying the composite wrap.

10. The method of claim 9, wherein forming the groove in the outer surface of the first rod comprises applying a radially inward force by the forming tip while rotating the first rod.

11. The method of claim 9, wherein forming the groove in the outer surface of the first rod comprises machining the groove into the first rod.

12. The method of claim 9, wherein the first rod comprises a circular cross-section.

13. The method of claim 9, wherein the second rod comprises a circular cross-section.

* * * * *